(12) United States Patent
Sakuraba et al.

(10) Patent No.: US 6,238,806 B1
(45) Date of Patent: May 29, 2001

(54) CLAD STEEL PIPE

(75) Inventors: Masahiro Sakuraba, Hokkaido; Masahiko Taguchi, Tokyo; Yasunobu Saitoh, Hokkaido, all of (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/567,323

(22) Filed: May 9, 2000

(51) Int. Cl.[7] ............................. F16L 9/02; F16L 25/00; F16L 58/08; B21C 37/09
(52) U.S. Cl. ................... 428/609; 428/683; 428/685; 138/142; 138/143; 285/288.1
(58) Field of Search ........................ 428/586, 685, 428/609, 683; 138/142, 143; 285/288.1, 329

(56) References Cited

U.S. PATENT DOCUMENTS

| | | | | |
|---|---|---|---|---|
| 315,565 | * | 4/1885 | Speer | 138/142 |
| 359,319 | * | 3/1887 | Godfrey | 138/143 |
| 406,140 | * | 7/1889 | Howell | 285/288.1 |
| 1,039,065 | * | 9/1912 | Maertens | 138/142 |
| 3,137,066 | * | 6/1964 | Merino et al. | 285/288.1 |
| 3,557,839 | * | 1/1971 | Uto et al. | 138/140 |
| 3,762,881 | * | 10/1973 | Dunn | 138/142 |
| 4,556,240 | * | 12/1985 | Yoshida | 285/288.1 |

FOREIGN PATENT DOCUMENTS

| | | | |
|---|---|---|---|
| 341886 | 5/1927 | (BE) | . |
| 384177 | 4/1932 | (GB) | . |
| 54-10423 | * 1/1979 | (JP) | . |
| 58-154488 | 9/1983 | (JP) | B23K/31/06 |

OTHER PUBLICATIONS

Database WPI Section Ch, Week 8932, Sep. 20, 1989, Derwent Publications Ltd., London GB; Class M21, AN 89–232793 XP002149291 & SU 1 346 377 A (Pipe IND RES INST), *abstract*.

* cited by examiner

*Primary Examiner*—John J. Zimmerman
(74) *Attorney, Agent, or Firm*—Sughrue, Mion, Zinn, Macpeak & Seas, PLLC

(57) ABSTRACT

A clad material of a clad steel pipe is disposed on at least one of an internal surface and external surface of a base material, the clad material having two lateral edges which are welded together to form the pipe. A thickness of the clad material at the two ends of the clad material in a lengthwise direction is predetermined at a first value, the first value which enables absorption of a discrepancy in thickness when connecting the clad steel pipe to another clad steel pipe; and wherein a thickness of the clad material at other parts other than the two ends is determined to be at a second value which is smaller than the first value.

1 Claim, 5 Drawing Sheets

CLAD STEEL PIPE

BACKGROUND OF THE INVENTION

1. Field of the Invention

The invention relates to a clad steel pipe which is furnished with a clad material comprising a corrosion resistant material on an internal surface or an external surface of a steel pipe as a base material, and more particularly, to a structure for reducing the amount of using the clad material.

2. Description of the Related Art

In general, a steel pipe has a property excellent in strength but a disadvantage of being poor in corrosion resistance. Therefore, the steel pipe is provided with a measure of corrosion resistance in view of the using environments and others, and then used. In particular, when a high corrosion resistance is demanded, a solid pipe made of a corrosion resistant material such as a stainless steel is provided instead of a steel pipe.

However, the solid pipe made of the corrosion resistant material is expensive in itself and inferior in strength compared with a steel pipe. For securing the strength of the solid pipe, the amount of employing materials should be increased, but the result is very expensive.

Accordingly, as a high corrosion resistant steel pipe for solving those problems, a clad steel pipe has been developed and broadly used, which is furnished with a clad material including the corrosion resistant material on an internal surface or an external surface of the steel pipe which is the base material.

Referring to FIGS. 3 and 4, conventionally, JP-A-58-154488 sets forth a method of curving the clad steel plate or the clad steel band 21 in a width direction to shape a pipe, for example, as shown in FIG. 3, and welding both edges 22 to be a seam part in a width direction of the clad steel plate or the clad steel band 21, thereby to manufacture a clad steel pipe 20.

In the clad steel plate or band 21, as shown in FIG. 4, the height of a base plate of both edges 22 to be the seam part in the width direction is formed to be thinner than other parts of both edges 22, and at the same time, a clad material 23 to be covered by both ends 22 is formed to be thicker than the clad material 23 other than both edges 22 in the width direction, and as a whole, a uniform thickness is provided.

In the conventional clad steel pipe 20 as shown in FIGS. 3 and 4, the thickness A (FIG. 4) of the clad material 23 of both edges 22 to be the seam part in the width direction of the clad steel plate or band 21 is larger than the thickness B (FIG. 4) of the clad material 23 at other than both edges 22. Thereby, such an arrangement absorbs a discrepancy caused by welding both edges 22 in the width direction of the clad steel plate or band when manufacturing the clad steel pipe 20 (hereafter called the "discrepancy at the welded part when manufacturing the clad steel pipe 20").

It is accordingly possible to prevent the corrosion resistance from deterioration caused by the discrepancy at both edges of the clad material 23 in the seam part of the clad steel plate or band 21.

However, on the other hand, no consideration is paid at all to the absorption of a discrepancy caused when welding the clad steel pipes to each other in a construction field of laying clad steel pipes. That is, such a discrepancy as shown with dotted lines in FIG. 5 caused by dimensional tolerance or out of roundness (hereafter called the "discrepancy at the welded part when laying the clad steel pipes 20").

For absorbing the discrepancy at the welded part when executing work on the clad steel pipes, the thickness of the clad material at both ends in the length direction of the clad steel pipe must be determined to be large values having a margin for the amount of an expected discrepancy.

Considering this fact, by application to the conventional clad steel pipe 20, since the thickness of the clad material 23 is, as shown in FIGS. 6A and 6B, uniform in the length direction of the clad steel pipe 20, the thickness B of the clad material 23 other than at both edges 22 in the width direction, to be a seam part of the clad steel plate or band 21, must be determined to be a value which can absorb the discrepancy in the welded part when executing the laying of the clad steel pipe 20.

In short, in the conventional clad steel pipe 20, attention is given only to the absorption of the discrepancy at the welded part when manufacturing the clad steel pipe 20, while no attention is paid to the absorption of the discrepancy at the welded part when laying the clad steel pipe 20. If the clad material 23 has a large thickness (defined by a thickness A) in both edges 22 at the seam part of the clad steel plate or band 21, it is possible to suppress the amount of use of the expensive clad material 23.

But in view of the actual execution where many clad steel pipes 20 are connected to one another by welding in the laying construction field in the length direction over several kilometers to several tens of kilometers in total extension, the discrepancy at the welded part when laying the clad steel pipe 20 must by all means, be absorbed.

In addition, in the welding works in the laying field where the equipment and the working circumstances are largely restrained, the discrepancy at the welded part when laying the clad steel pipe 20 should be also absorbed in order to select a suitable welding method to effect a high working efficiency.

Therefore, in the structure of the conventional clad steel pipe 20, the thickness B of the clad material 23 other than at both edges in the width direction to be the seam part of the clad steel plate or band 21, is determined to be the value which can absorb the discrepancy at the welded part when laying the clad steel pipe 20, and the thickness A of the clad material 23 of both edges in the width of the clad steel plate or band 21 is determined to be larger than the thickness B.

Such a situation does not reduce the amount of use of the expensive clad materials 23 but increases it in proportion to the difference between the thickness A and the thickness B. Besides, since the thickness A and the thickness B of the clad materials 23 are uniform in the length direction of the clad steel pipe 20 as shown in FIG. 6B, the amount of use of the clad materials 23 may be probably heightened several tens of times or several hundreds of times depending on the laying distance, inviting a tremendous increase in cost.

With respect to the clad steel pipe 20 and corrosion resistance, a margin for corrosion is not necessary when the clad material is correctly selected and sizes of the clad material 23 provide no influence with respect to the corrosion resistance.

Therefore, in spite of only both edges 22 for the seam part in the width direction of the clad steel plate or band 21 being used in the conventional clad steel pipe 20, the forming of the clad material 23 to be thick denotes a very ineffective use of many clad materials 23 which make no contribution to the corrosion resistance, and gives impetus to cost increases.

SUMMARY OF THE INVENTION

It is an object of the invention to offer a clad steel pipe which can exactly absorb the discrepancy when welding clad steel pipes to each other in the laying field thereof, and though securing high corrosion resistibility, can decrease the amount of use of expensive clad materials, as the laying distance becomes longer, and further, can save costs.

The object of the invention can be accomplished by a clad steel pipe which is furnished with a clad material including a corrosion resistant material on an internal surface or an external surface of a steel pipe being a base material, wherein a thickness at both ends of the clad material in a lengthwise direction is determined to be a fixed value which enables absorption of the discrepancy in thickness when connecting one clad steel pipe to another, while the thickness of the clad material at other parts other than the two ends of the pipe is determined to be at a value which is smaller than the fixed value.

In the clad steel pipe according to the invention, the thickness of the clad materials at both ends of the pipe in the lengthwise direction is set to be a predetermined value which enables absorption of the discrepancy in thickness when connecting the instant clad steel pipe with another clad steel pipe, the discrepancy with the other clad steel pipe being exactly absorbed, for example, when connecting the clad steel pipes in the actual laying field.

That is, even if the discrepancy caused by such a dimensional tolerance or out of roundness exists more or less at the connecting part of the clad material of each clad steel pipe, it is absorbed by the thickness of both ends in the lengthwise direction of the clad material of each clad steel pipe. Thus, the steel pipe which is the base material is not exposed to a substance flowing in the clad steel pipe.

The thickness of the clad material at the parts other than at both ends in the lengthwise direction of the pipe, is set to be a value smaller than a predetermined value, with the longer the clad steel pipe is in the lengthwise direction, the less being the amount of use of the corrosion resistant material which is the material acting as the clad material. Accordingly, the amount of use of the expensive clad materials is decreased as the laying distance of the clad steel pipe becomes longer.

DETAILED DESCRIPTION OF THE PREFERRED EMBODIMENTS

The invention will be explained by way of the shown embodiments.

Figure 1A:
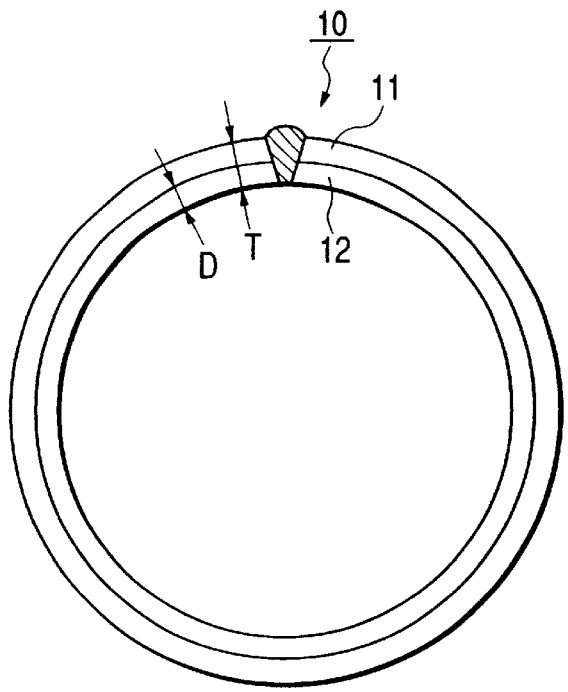
FIGS. 1(a) and (b) are views showing one embodiment of the clad steel pipe of the present invention.
Figure 1B:
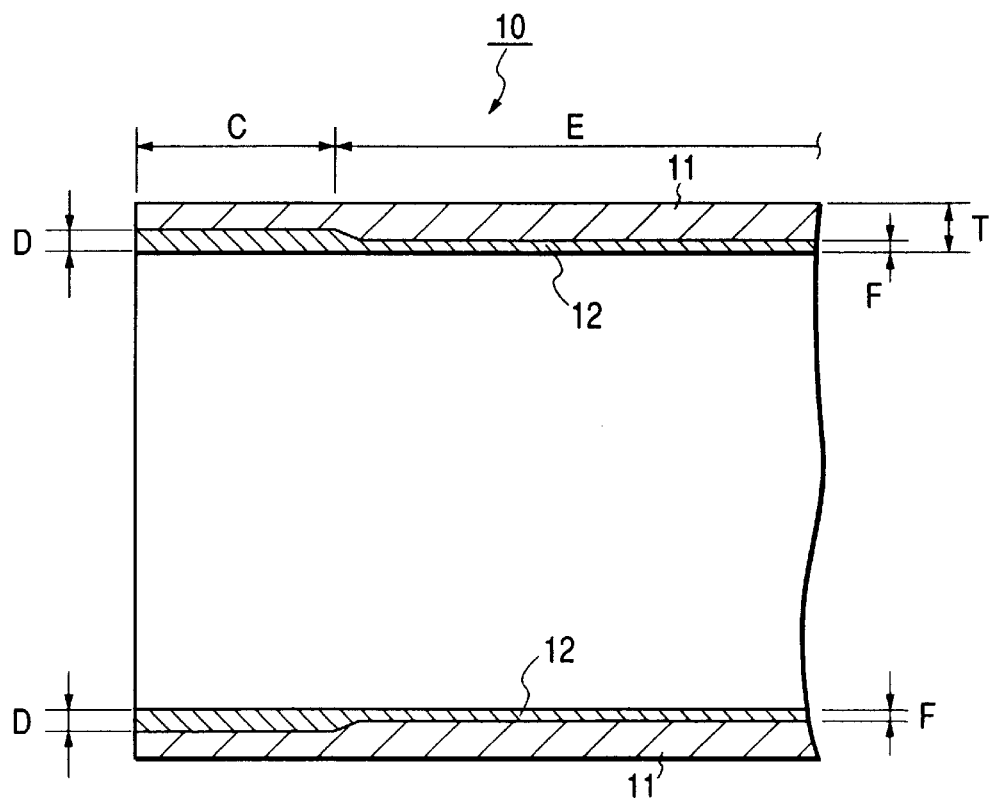
Figure 2:
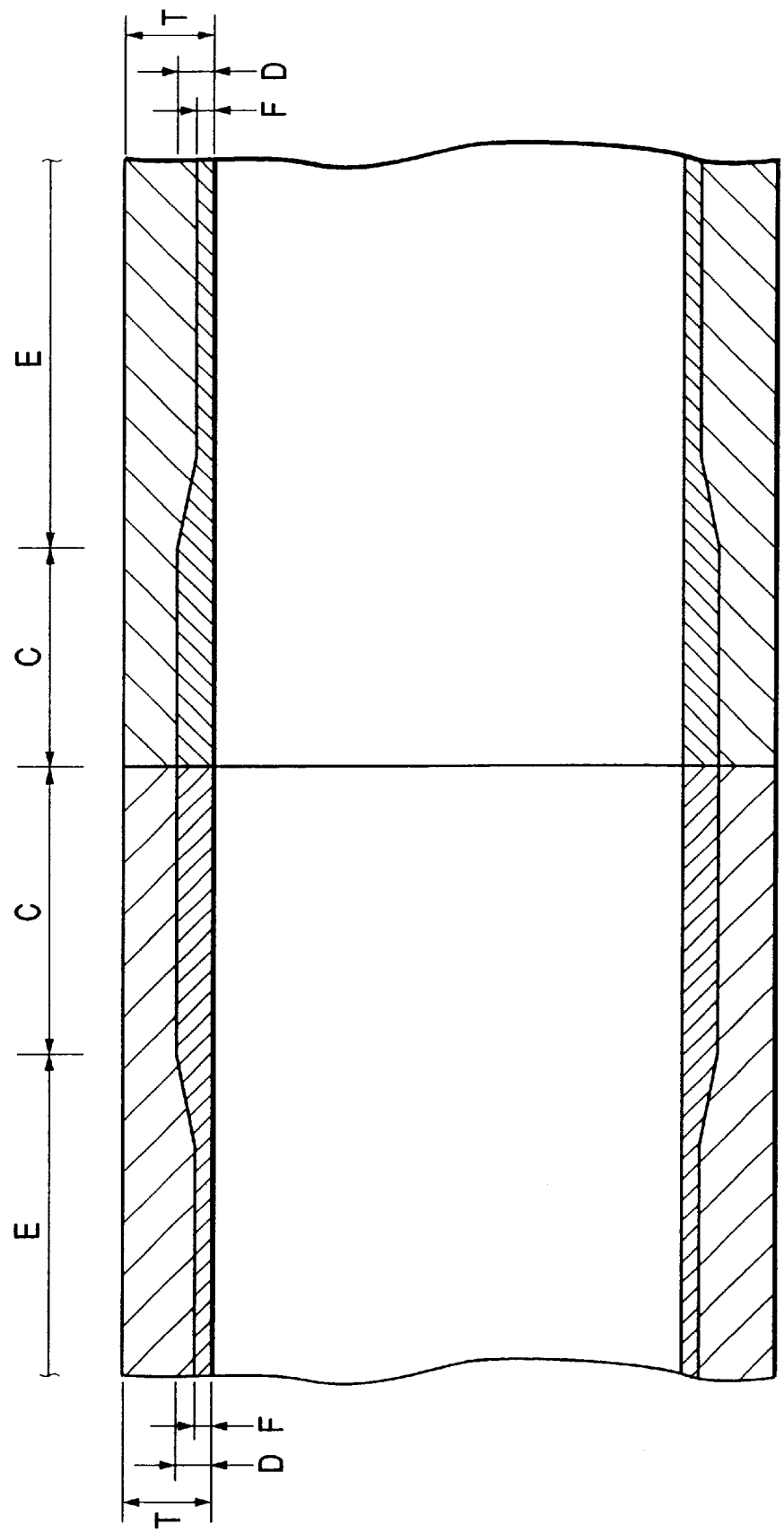
FIG. 2 is an elementary cross sectional view along the lengthwise direction, showing that two pieces of the clad steel pipes of FIG. 1 are connected.
Figure 3:
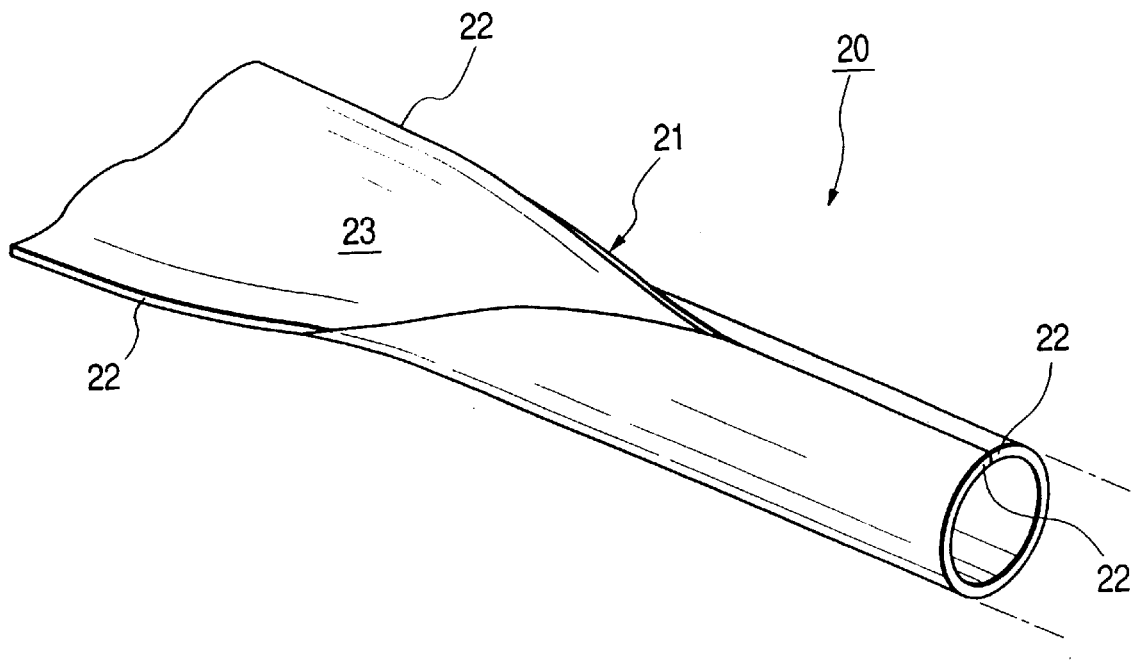
FIG. 3 is a perspective view showing a condition of the way of forming a conventional clad steel pipe from a clad steel band.
Figure 4:
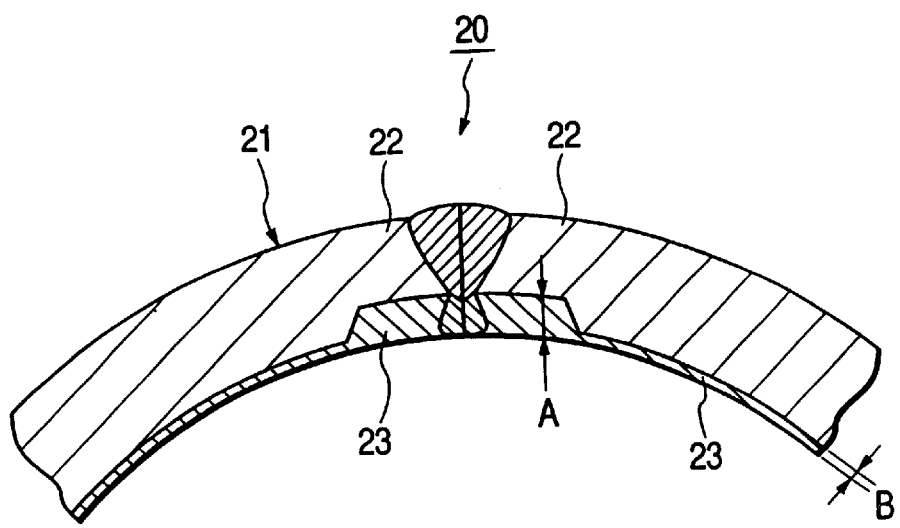
FIG. 4 is an elementary cross sectional view along the length direction and the transverse direction, showing a welded part during manufacturing the conventional clad steel pipe.
Figure 5:
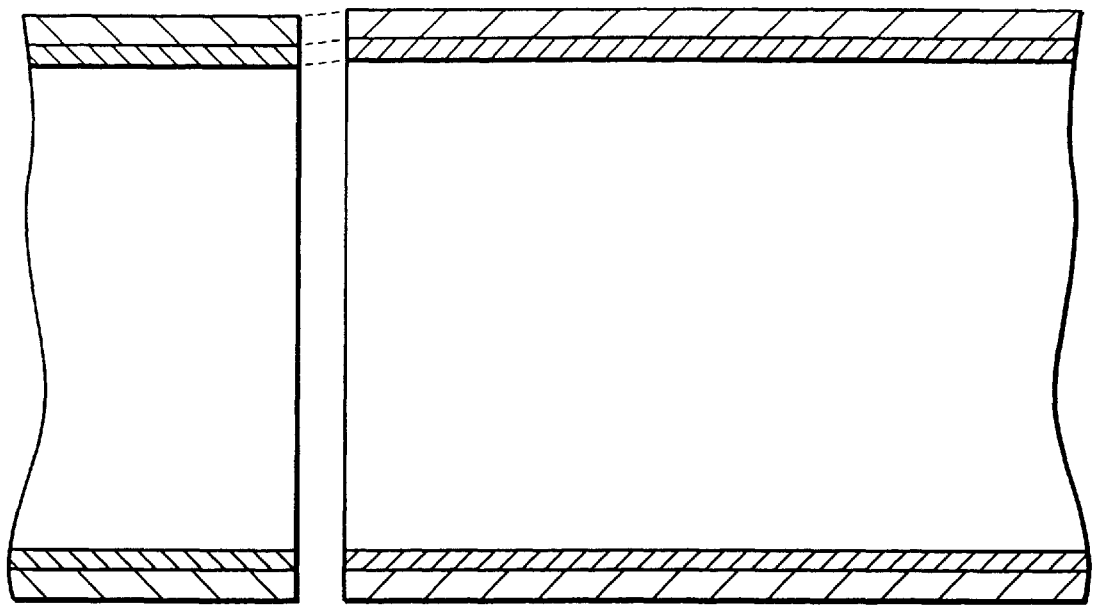
FIG. 5 is an elementary cross sectional view showing the condition of connecting two pieces of the conventional clad steel pipes.
Figure 6A:
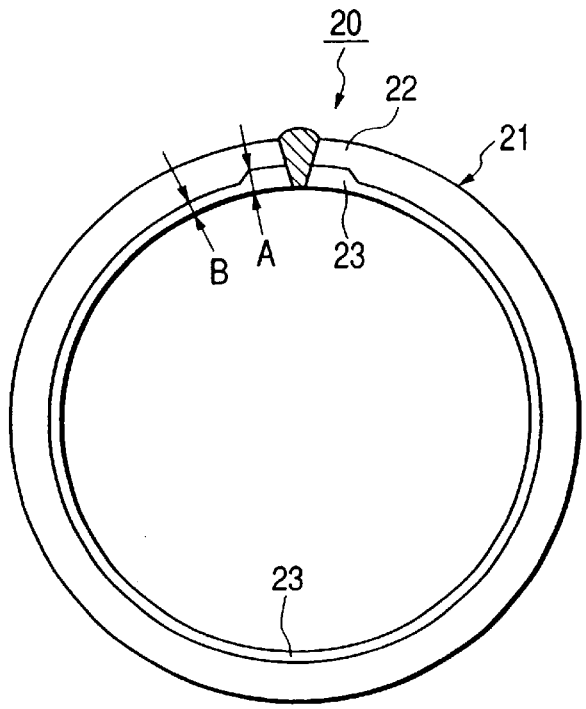
FIGS. 6 (a) and (b) are views showing the conventional clad steel pipe.
Figure 6B:
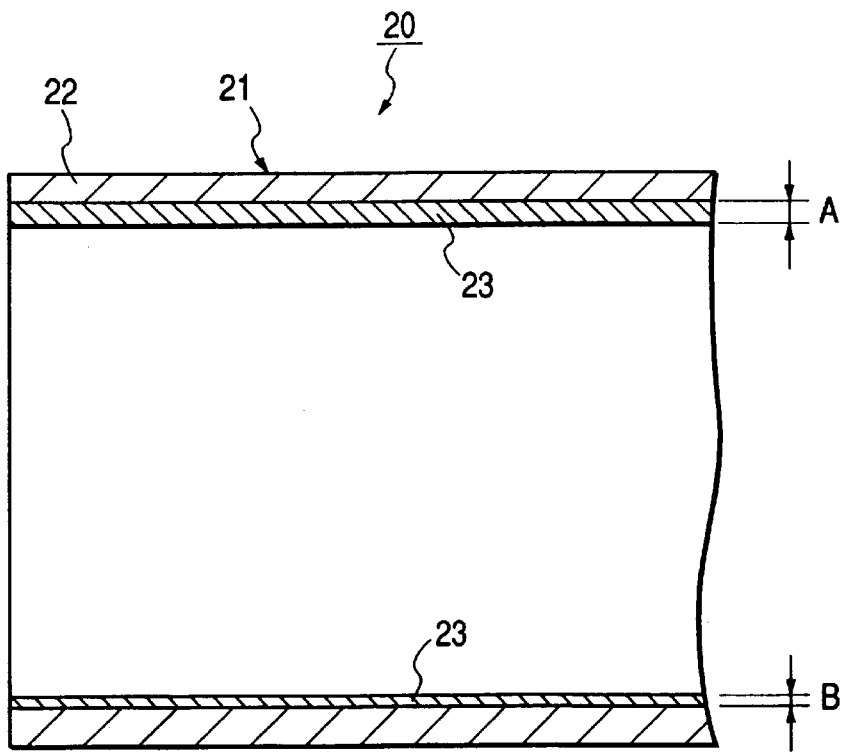

FIG. 1 is a view showing one mode of the clad steel pipe of the invention, and FIG. 1A is a side view seen from the lengthwise direction, and FIG. 1B is a cross sectional view along the lengthwise direction. FIG. 2 is an elementary cross sectional view along the lengthwise direction, showing that two pieces of the clad steel pipes of FIG. 1 are connected.

In these Figures, the clad steel pipe 10 is realized by furnishing the clad material 12 comprising the corrosion resistant material, such as stainless steel, on the internal circumference of the base material 11. The total T of the thickness of the base material 11 and the thickness of the clad material 12 is equal over the full length of the clad steel pipe 10 (dimension in the lengthwise direction), and the clad steel pipe 10 has the thickness T, which is uniform within the prescribed tolerance over the full length of the pipe.

The clad material 12 is determined with respect to the thickness at both ends C in the lengthwise direction of the clad steel pipe 10 (the right and left directions in FIG. 1B and FIG. 2), that is, the thickness at both ends in the lengthwise direction which are the welded parts when welding laid clad steel pipes 10 in the construction field, so that the thickness has the value D enabling absorption of the discrepancy with the other clad steel pipe 10 when welding the laid clad steel pipe 10. The clad material 12 is further determined with respect to the thickness of the part E other than at both ends C, so that the thickness has the value F smaller than the predetermined value D.

Still, further reference will be made to the work of the practiced embodiment.

When welding the clad steel pipes 10 in the laying construction field, if the thickness of the clad material 12 at both ends C of the clad steel pipe in the lengthwise direction is of the predetermined value D, the discrepancy between the clad steel pipes is exactly absorbed.

That is, if the discrepancy caused by dimensional tolerance or out of roughness in each clad steel pipe 10 exists more or less at the welded part of the clad material 12 of each clad steel pipe 10, it is absorbed by the thickness D of the clad material of each clad steel pipe, and the base material is not exposed to a substance passing in the clad steel pipe.

As the thickness of the clad materials 12 at the parts E other than both ends C in the lengthwise direction of the clad steel pipe 10 is set to be the value F smaller than the predetermined value D, the longer is the clad steel pipe 10 in the lengthwise direction, and the less is the amount of using the corrosion resistant material which is a material of the clad material 12. Accordingly, the amount of use of the expensive clad materials is decreased as the laying distance of the clad steel pipe 10 becomes longer.

According to the above practicing mode, by setting the thickness of the clad material 12 at both ends C in the length direction of the clad steel pipes 10 to be the predetermined value D, it is possible to exactly absorb the discrepancy when welding the clad steel pipes 10 in the actual construction field of laying the clad steel pipes 10, and to secure a high corrosion resistance. Besides, by setting the thickness of the clad material 12 at the parts E other than both ends C in the length direction to be the value F smaller than the predetermined value D, it is possible to not negatively influence the corrosion resistance, and to decrease the amount of use of the expensive clad material 12 and thus, very effectively use the clad material 12. Thereby, the more extended the laying distance of the clad steel pipe 10, the larger the cost saving effect can be obtained.

With respect to the corrosion resistance of the clad steel pipe 10, the margin for corrosion is not necessary since the clad material 12 comprises the correctly selected corrosion resistant material, and sizes of the thickness of the clad material 23 do not influence the corrosion resistance. Therefore, by exactly absorbing the discrepancy at the welded parts when laying the clad steel pipes 10, it is possible to secure a high corrosion resistance while largely curtailing the amount of the clad material 12 which does not contribute to the corrosion resistance.

Considering the actual use mode of the clad steel pipe 10, namely, the use mode that many clad steel pipes 10 are connected to one another by welding them in the laying construction field in the lengthwise direction, for example, several kilometers to several tens of kilometers in total extension, it is possible to decrease the amount of use of the expensive clad material 12 as the laying distance of the clad steel pipe 10 is elongated. The cost saving effect of the clad steel pipe 10 in the practicing mode is made larger in proportion to the laying distance of the clad steel pipe 10.

In welding work in the laying construction field where the equipment, and the working circumstances are largely restrained, it is possible to select a suitable welding method and attempt to improve the working efficiency.

According to the invention, the thickness of the clad material at both ends of the clad steel pipe in the lengthwise direction is set to be the predetermined value which enables absorption of the discrepancy when connecting one clad steel pipe with another clad steel pipe, and at the same time, the thickness of the clad material at the parts other than both ends in the length direction of the clad steel pipe is set to be the value smaller than the predetermined value.

It is possible to exactly absorb the discrepancy when welding clad steel pipes to each other in the laying field thereof, and though securing high corrosion resistibility, decrease the amount of use of expensive clad material as the laying distance becomes longer and, thus, save costs.

What is claimed is:

1. A clad steel pipe comprising:

a corrosion resistant clad material disposed on at least one of an internal surface and external surface of a base material, said clad material having two ends in a lengthwise direction, and two lateral edges which are welded together to form a cylindrical pipe;

wherein a thickness of said clad material at said two ends of the clad material in said lengthwise direction thereof being predetermined at a first value, said first value which enables absorption of a discrepancy in thickness when connecting said clad steel pipe to another clad steel pipe; and wherein a thickness of the clad material at other parts than said two ends is determined to be at a second value which is smaller than said first value.

* * * * *